J. L. SLOCUMB.
Cotton-Seed Planters.
No. 141,085. Patented July 22, 1873.
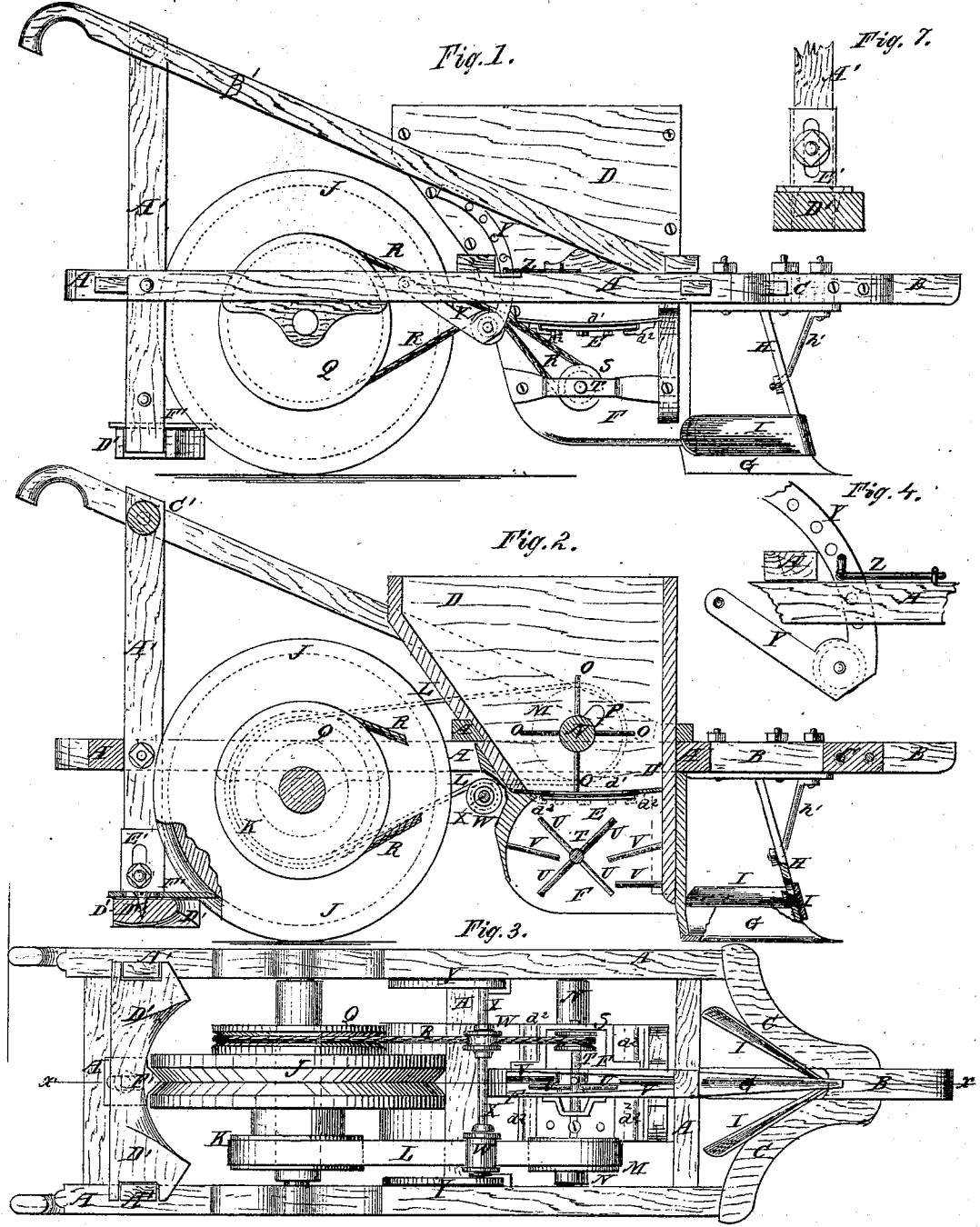
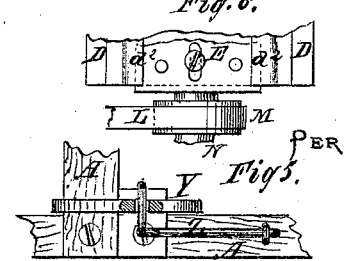
Witnesses.
P. C. Dieterich
C. Sedgwick
Inventor.
J. L. Slocumb
per
Attorneys.

UNITED STATES PATENT OFFICE.

JOHN L. SLOCUMB, OF RAYMOND, MISSISSIPPI.

IMPROVEMENT IN COTTON-SEED PLANTERS.

Specification forming part of Letters Patent No. 141,085, dated July 22, 1873; application filed November 16, 1872.

*To all whom it may concern:*

Be it known that I, JOHN L. SLOCUMB, of Raymond, in the county of Hinds and State of Mississippi, have invented a new and useful Improvement in Cotton-Seed Planters, of which the following is a specification:

Figure 1 is a side view of my improved planter. Fig. 2 is a vertical longitudinal section of the same, taken through the line $x\,x$, Fig. 3. Fig. 3 is a bottom view of the same. Fig. 4 is a detail view of the device for supporting and adjusting the idler. Fig. 5 is a top view of the same, part being broken away to show the construction. Fig. 6 is a detail view of the slide for regulating the size of the discharge-opening, and Fig. 7 is a detail view of the device for adjusting the covering-block.

Similar letters of reference indicate corresponding parts.

The invention consists in the improvement of cotton-seed planters, as hereinafter fully described and pointed out in the claim.

A represents the frame of the planter. To the center of the forward cross-bar of the frame A is secured the rear end of the draw-bar or beam B, which is strengthened by braces C. D is the seed-hopper, which is secured to the frame A, and in the bottom of which is formed a wide slot, $d^1$, for the escape of the seed. The size of the discharge-opening $d^1$ is regulated to regulate the quantity of seed dropped by slides E, which work in guides $d^2$ attached to the bottom of the hopper D, and are secured in place, when adjusted, by set-screws which pass through slots in the slides E, and screw into the hopper-bottom. F is the conductor-spout, which is made long and narrow, and is secured to the frame A and hopper D directly beneath the discharge-opening $d^1$ of said hopper. G is the plow for opening the furrow to receive the seed. The upper part of the sides of the opener G gradually spread apart toward the rear, giving the said opener a V shape at its rear end to give the desired form to the furrow. The rear end of the opener G is secured to the forward end of the spout F, and its forward end is attached to a standard, H, which is strengthened against the draft strain by a brace, $h'$. The upper ends of the standard H and brace $h'$ are secured to the beam B. To the standard H are secured the forward ends of the sweeps I, which incline rearward and outward, and the lower parts of which overlap the upper part of the opener G. The sweeps I are designed to push back the clods and top soil, leaving the furrow of a uniform depth. The sweeps I are secured to the standard H by a bolt, which passes through a slot in said standard, as shown in Fig. 3, so that the said sweep can be adjusted higher or lower, to enable the seeds to be planted deeper or shallower in the ground, as may be desired. J is the drive-wheel, the journals of which revolve in bearings attached to the frame A in the rear of the hopper D. The face of the drive-wheel J has a deep and wide V-shaped groove formed in it, so that it may press the sides of the furrow inward to cover the seed without packing it upon said seed. With the wheel J or its shaft is rigidly connected a pulley, K, around which passes a band, L, which also passes around a pulley, M, attached to the end of the shaft N. The shaft N passes through the lower part of the hopper D, and revolves in bearings attached to the frame A. To the shaft N, within the hopper D, are attached radial arms O, which, as the said shaft is revolved, keep the cotton-seeds stirred up so that they cannot clog, and will pass readily to the discharge-opening $d^1$. To the shaft N, near the sides of the hopper D, and upon the opposite sides of the radial arms O, are attached two plates or flat arms, P, which are set at an angle with the axis of the said shaft N, and are inclined in such directions as to push the seed from the sides toward the center of the hopper D, so that they may more readily pass out through the discharge-opening of said hopper. With the wheel J or its shaft is rigidly connected another pulley, Q, around which passes a band, R, which also passes around a pulley, S, attached to a shaft, T, that passes through the conductor-spout F, and revolves in bearings attached to said spout. To the shaft T, within the spout F, are attached two circles of radial arms, U, at such a distance apart that the arms V, rigidly attached to the front and rear edges of the spout F, may pass between them. By this device the seeds, as they pass through the spout F, will be separated from their fibers, or said fibers will be torn apart, so that the seeds will be deposited in the furrow uniformly and not in clumps or clusters, thus producing a much better stand of cotton, and one more easily cultivated. The lower parts of the bands L R pass over the pulleys W, attached to the shaft X, which revolves in bearings in the angles of the angular arms or brackets Y. Each of the brackets Y is made with one straight and one curved arm. The outer ends of the straight arm of the brackets Y are pivoted to the side bars of the frame A, and the curved arms of said brackets pass through keepers attached to the side beams of said frame, and have numerous holes formed in them to receive the spring-pins Z attached to the side bars of the frame A, so that by adjusting the brackets Y the bands L R may be tightened or loosened. The device W X Y also serves to hold the bands L R up, so that they cannot come in contact with the ground or with obstructions. To the rear part of the frame A are attached the standards A', to the upper ends of which are attached the handles B', the forward ends of which are attached to the forward part of the frame A. The handles B' and the upper ends of the standards A' are connected and held in their proper relative positions by a round, C'. D' is the covering-block, the forward and under sides of which are concave, as shown in Figs. 2 and 3, to adapt it to give a proper form to the top of the ridge. The forward sides of the end parts of the coverer D' are inclined, as shown in Fig. 3, so as to push the clods left by the sweeps I still further outward. To the upper side of the ends of the coverer D' are secured the horizontal parts of the angle-plates E', the vertical parts of which project along the inner side of the lower parts of the standards A', and are slotted to receive the bolt by which they are secured to said standards, so that the coverer D' may be adjusted higher or lower, as may be desired. To the middle part of the upper side of the coverer D' is bolted a plate, F', said bolt passing through a slot in said plate, so that the plate may be moved forward, as required, to take up the wear. The forward part of the plate F' is made angular, to enter the V-groove of the drive-wheel J and scrape off any soil that may adhere to it.

Having thus described my invention, I claim as new and desire to secure by Letters Patent—

The combination, with hopper and slides, of spout F, provided with rotary arms U and stationary arms V, arranged to operate as and for the purpose described.

JOHN L. SLOCUMB.

Witnesses:
IRA E. DAVIS,
J. C. FAIRCHILD.